United States Patent

[11] 3,568,006

[72] Inventor Carl E. Atkins Montclair, N.J.

[21] Appl. No. 695,708
[22] Filed Jan. 4, 1968
[45] Patented Mar. 2, 1971
[73] Assignee Wagner Electric Corporation

[54] CAPACITANCE RESPONSIVE CIRCUIT
9 Claims, 2 Drawing Figs.

[52] U.S. Cl. ...... 317/146, 328/28, 331/65, 331/131, 200/52
[51] Int. Cl. ...... H01h47/22, H03k 3/37
[50] Field of Search ...... 317/146, 148.5; 331/129, 65, 131, 71; 328/28

[56] References Cited

UNITED STATES PATENTS

| | | | |
|---|---|---|---|
| 2,351,439 | 6/1944 | Livingston | 331/71X |
| 3,011,102 | 11/1961 | Balan | 331/71X |
| 3,332,002 | 7/1967 | Jollois | 321/61 |
| 3,435,298 | 3/1969 | Atkins et al. | 317/146 |
| 3,422,415 | 1/1969 | Ichimori | 317/146X |
| 3,252,070 | 5/1966 | Medlar et al. | 331/129X |

*Primary Examiner*—Robert K. Schaefer
*Assistant Examiner*—William J. Smith
*Attorney*—Eyre, Mann & Lucas

ABSTRACT: The invention provides a capacitance-responsive circuit for controlling a relay. The circuit includes a relaxation oscillator having a neon tube, a transistor amplifier also having a neon tube, a semiconductor switch and a relay. The relaxation oscillator is operated by a combination of AC and DC power inputs whereby the neon tube of the oscillator conducts relatively early in each negative half-cycle and the magnitude of the initial output pulse of the oscillator, in each pulse train generated in each negative half-cycle, is increased. The oscillator output is fed as input to the transistor amplifier and the neon tube thereof regulates the bias voltage of the transistor, protects the transistor from excessive junction voltage and stabilizes the tube of the oscillator by illuminating it. The semiconductor switch controls a shunt path for the winding of the relay, and the shunt path includes a diode and a first resistor connected in parallel with each other and in series with a second resistor, whereby heat generated is less than with the second resistor alone.

INVENTOR.
CARL E. ATKINS
BY Eyre, Mann & Lucas
ATTORNEYS.

INVENTOR.
CARL E. ATKINS
BY Eyre, Mann & Lucas
ATTORNEYS.

CAPACITANCE RESPONSIVE CIRCUIT

The present invention comprises several improvements over copending application Ser. No. 550,765, filed May 17, 1966, which relates to a capacity-responsive circuit employing a low frequency relaxation oscillator and bias storage means.

The improvements described herein include the application of a DC voltage to one side of the oscillator circuit while AC voltage is being applied to the other side of the oscillator circuit, thereby causing the oscillator to generate a pulse train only during the negative half-cycle. By thus limiting the generation of pulse trains to every other half-cycle, the neon tube is nonconductive for a much greater percentage of a cycle than if pulse trains were generated on both the positive and the negative half-cycles. Consequently, the neon gas is more completely de-ionized between pulse trains. The more complete is the deionization of the gas, the greater is the magnitude of the voltage required to ionize the gas. Thus, in the present invention, the first pulse of each pulse train will be significantly larger than the subsequent pulses. These larger first pulses will be generated at the same frequency as the applied AC voltage, and they will control the state of the semiconductor switch. The magnitude of these larger first pulses in the AC powered oscillator of the invention is more nearly constant than the pulses in the single continuous pulse train of a DC powered oscillator. The frequency of the pulses in each pulse train in the AC powered oscillator of the invention will vary with varying line voltage, but this is unimportant from the standpoint of circuit response to a predetermined range of signals, since the frequency of the controlling large first pulses will remain constant at the frequency of the applied AC voltage.

The circuitry providing the DC voltage to one side of the oscillator also provides the DC power for the transistor amplifier. The bias circuitry of the transistor amplifier includes a gas-filled lamp, which provides some degree of regulation of the collector-to-base bias voltage. This lamp also protects the collector-base junction of the transistor from excessive voltage by limiting the voltage across that junction at no more than about 60 volts DC Since this lamp is constantly lit, it is placed in proximity with the gas-filled lamp in the oscillator circuit to bathe the latter in light. The ionization voltage of the blinking lamp in the oscillator circuit has been found to be more stable in an illuminated environment than in a dark environment.

Lastly, a diode and a resistor connected in parallel with each other are connected in series with a current-limiting resistor in the current path controlled by the semiconductor switch. These three elements are also in the charging path of the bias storage circuit. The parallel diode-resistor combination serves to reduce the average current and the heat generated by current flow through the resistors.

Figure 1:
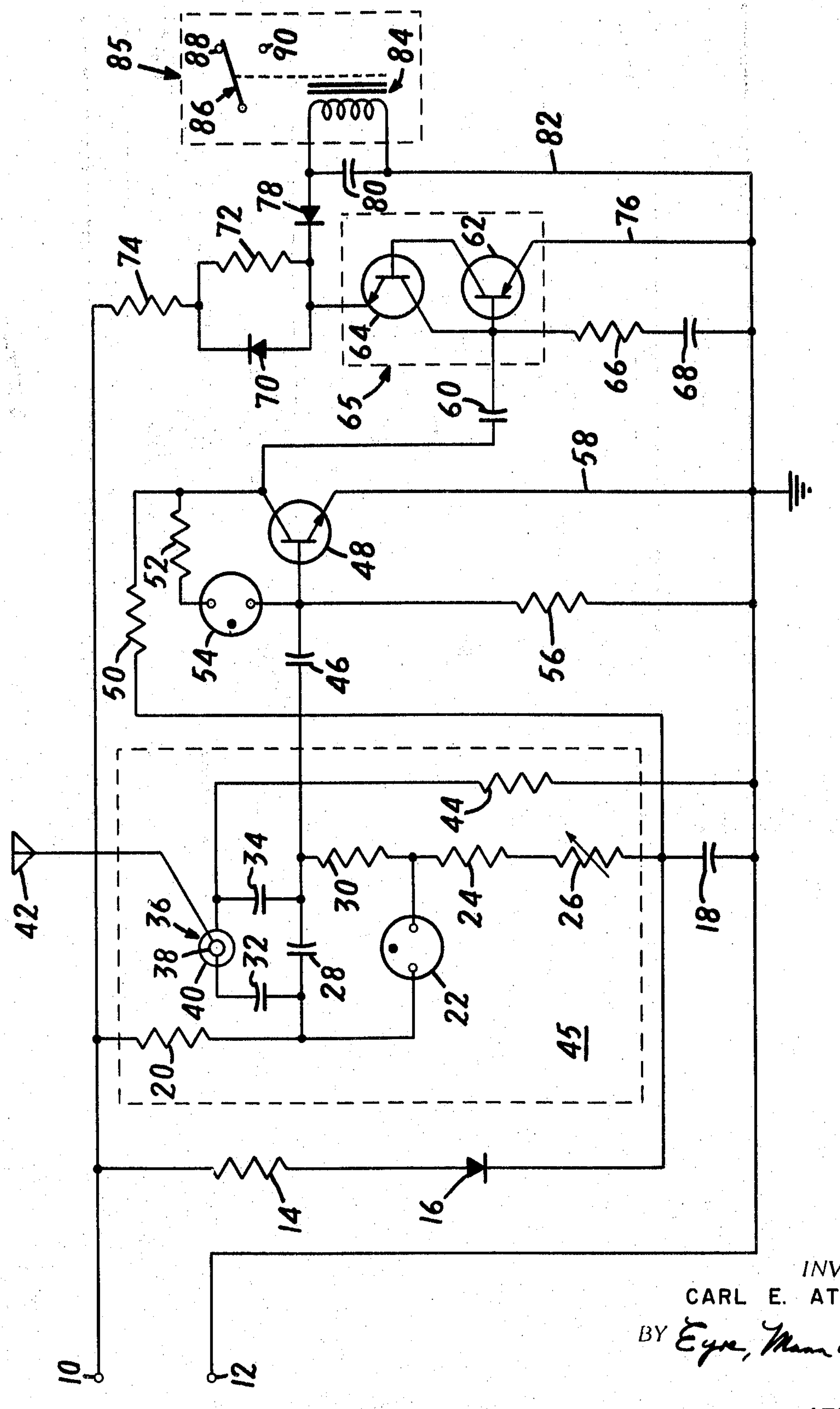
FIG. 1 illustrates a specific embodiment of the capacitance responsive circuit.

Referring now to FIG. 1, terminals 10 and 12 are connected to a standard 115 volt 60 hertz power source, terminal 12 being grounded. Resistor 14, diode 16 and capacitor 18 are connected in series between terminal 10 and ground. Resistor 20, neon tube 22, resistor 24 and variable resistor 26 are connected in series between terminal 10 and the high side of capacitor 18. Connected in parallel with neon tube 22 is a circuit branch comprising capacitor 28 and resistor 30. Capacitor 28 is connected in parallel with a circuit branch comprising blocking capacitors 32 and 34 and coaxial cable 36. Capacitor 32 connects the inner conductor 38 of coaxial cable 36 to the high side of capacitor 28. Capacitor 34 connects the outer conductor 40 of coaxial cable 36 to the low side of capacitor 28. Antenna 42 is connected to the remote end of inner conductor 38. Resistor 44 is connected in series between the outer conductor 40 and ground to insure complete charging of capacitor 34. The value of resistor 44 is sufficiently large to render insignificant its effects on the dynamic characteristics of the oscillator. The foregoing components from the relaxation oscillator 45.

The output of oscillator 45 is obtained at the junction of capacitor 28 and resistor 30 and is transmitted through blocking capacitor 46 to the base of transistor 48. Direct current power is applied to the collector of transistor 48 by means of a resistor 50 connected from the high side of capacitor 18 to the collector. The bias circuitry for transistor 48 comprises resistor 52 and gas-filled tube 54 connected in series between the collector and the base, and a resistor 56 connected between the base and the emitter. The emitter of transistor 48 is connected to ground by conductor 58.

The output of the transistor 48 is transmitted through blocking capacitor 60 to the base and collector of transistors 62 and 64 respectively, which are a complementary transistor pair connected in the regenerative feedback configuration to form a solid-state switch 65. Resistor 66 and capacitor 68 are connected in series between the base of transistor 62 and ground to form a bias storage circuit. The emitter of transistor 64 is connected to the anode of diode 70, which is connected in parallel with resistor 72. The cathode of diode 70 is connected to terminal 10 through resistor 74. Conductor 76 connects the emitter of transistor 62 to ground.

The cathode of diode 78 is connected to the emitter of transistor 64. The anode of diode 78 is connected to the high side of capacitor 80, the other side of which is connected to ground by conductor 82. Winding 84 of relay 85 is connected in parallel with capacitor 80. Relay 85 also includes armature 86 and contacts 88 and 90, which may be connected to a source of power and one or more circuits to be energized, as desired.

A preferred set of values for the various circuit elements is as follows:

| | |
|---|---|
| Resistor **14** | 10,000 ohms |
| Capacitor **18** | 1 microfarad |
| Resistor **20** | 2.7 megohms |
| Resistor **24** | 2,100 ohms |
| Resistor **26** | 0 to 1300 ohms |
| Capacitor **28** | 500 picofarads |
| Resistor **30** | 100 ohms |
| Capacitor **32** | 0.001 microfarad |
| Capacitor **34** | 0.1 microfarad |
| Resistor **44** | 510,000 ohms |
| Capacitor **46** | 0.047 microfarad |
| Resistor **50** | 330,000 ohms |
| Resistor **52** | 100,000 ohms |
| Resistor **56** | 18,000 ohms |
| Capacitor **60** | 300 picofarads |
| Resistor **66** | 47,000 ohms |
| Capacitor **68** | 0.147 microfarad |
| Resistor **72** | 330,000 ohms |
| Resistor **74** | 8,200 ohms |
| Capacitor **80** | 16 microfarads |

Figure 2:
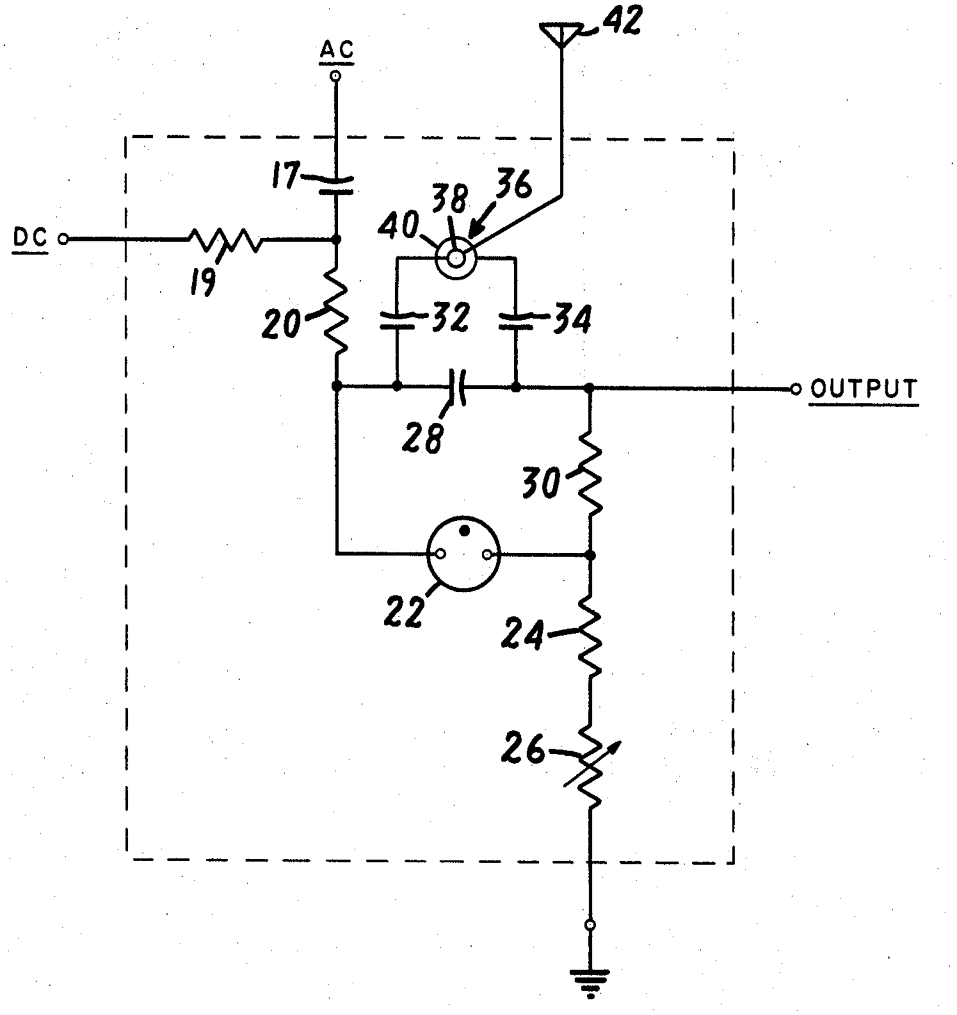
FIG. 2 illustrates an alternate embodiment of the oscillator employed in the circuit shown in FIG. 1.

Referring now to FIG. 2, a capacitor 17 and a resistor 19 are connected between the high side of resistor 20 and, respectively, the AC and DC input terminals of the oscillator circuit shown in FIG. 1. The low side of resistor 26 is connected to ground.

A preferred set of values for the various circuit elements is the same as for the oscillator circuit of FIG. 1, except as follows:

| | |
|---|---|
| Capacitor 17 | 0.1 microfarads |
| Resistor 19 | 100,000 ohms |
| Resistor 20 | 2 megohms |

The operation of the circuit shown in FIG. 1 is described in the paragraphs below.

When standard 117 volt 60 hertz AC power is applied across terminals 10 and 12, it is converted into DC power in a conventional manner by the circuit loop consisting of resistor 14, diode 16 and capacitor 18. The DC power thus produced is sufficiently ripple-free to provide a nearly constant bias of about 80 volts to the oscillator circuit 45 at the junction of capacitor 18 and resistor 26. When the AC voltage applied to the upper terminal of resistor 20 is in the positive half of the cycle, the voltage across neon tube 22 will not reach a magnitude sufficiently large to cause the neon tube 22 to break down and conduct. Very early in the negative half-cycle the voltage across the tube will reach a level sufficient to cause conduction, and a train of output pulses will be generated during a portion of the negative half-cycle. This pulse train will be generated as follows: when the voltage across the net capacitance of capacitors 28, 32 and 34, coaxial cable 36, and antenna 42 reaches the breakdown voltage level of the neon tube 22, the gas in the tube will become ionized and the tube will be rendered conductive. The aforementioned net capacitance will discharge through resistor 30 and tube 22 until the voltage across the tube falls to the extinction level, i.e., the voltage at which the gas in the tube 22 will become deionized. Simultaneous with the discharge of the aforementioned net capacitance, while the tube 22 is conductive, a DC current path is closed through resistors 26 and 24, tube 22 and resistor 20, and DC current will flow toward terminal 10. Thus, simultaneous voltage pulses of opposite polarity appear across resistor 30 and across the combined resistance of resistors 24 and 26. By proper selection of the values of the aforementioned resistors and of the capacitances comprising the aforementioned net capacitance, the magnitude and polarity of the sum of these pulses, constituting the output of the oscillator, can be controlled. Variable resistor 26 provides a means of adjusting for variation in the net capacitance, the no-signal value of which may be varied by use of coaxial cable of various length and parameters. Antenna 42 senses an increase in capacitance to ground when a person or object approaches it, and thus provides a signal in the form of an increased net capacitance, which results in a larger discharge current, a larger voltage pulse across resistors 24 and 26, and less positive output pulses. The output pulses are detected at the junction of capacitor 28 and resistor 30, and are conducted via blocking capacitor 46 to the base electrode of transistor 48.

Single-stage amplification and reversal of polarity of the output pulses of oscillator 45 is effected by transistor 48 and its associated bias circuitry, the novel feature of which is the inclusion of a gas-filled tube 54 in series with bias resistor 52 across the base and collector electrodes of transistor 48. The tube 54 provides regulation of the voltage across the base-collector and base-emitter junctions by limiting current flow through resistor 52, the tube 54 itself, and resistor 56 to ground. The tube 54 is constantly conductive when the circuit is energized, i.e., the gas in the tube is constantly ionized and luminescent during circuit operation. In the physical embodiment, this tube 54 is placed in proximity to tube 22 of the oscillator circuit in order to bathe the latter in the constant light of the former. This has been found to have a stabilizing effect on the ionization voltage of the tube 22.

The amplified pulses are conducted through blocking capacitor 60 to the control electrode of switch 65, which is normally conductive so as to shunt the winding 84 of relay 85. During the negative half-cycle, current is shunted through conductor 76, switch 65, diode 70 and resistor 74. During the positive half-cycle, diode 78 prevents current from flowing through the winding 84 of relay 85, and a charging current flows through resistors 74 and 72, the emitter-collector junction of transistor 64 and resistor 66 to capacitor 68. The upper limit of the voltage across capacitor 68 is determined by the Zener breakdown voltage of the base-emitter junction of transistor 62. The combined power dissipation of resistors 72 and 74 is considerably less than that of resistor 74 alone without the diode 70-resistor 72 combination in the current path, since average current is substantially reduced by that combination. Thus, the heat generated within the narrow confines of the electronics package of the physical embodiment is greatly reduced, thereby prolonging the duration of service of the closely spaced circuit components.

When the negative pulses applied to the control electrode of the switch 65 are reduced sufficiently in response to an increase in the capacitance of antenna 42 to ground, the positive bias provided by capacitor 68 will render the switch 65 nonconductive, thereby opening the shunt path and causing the winding 84 of relay 85 to be energized. During the negative half-cycle of the applied AC power, current will flow through the winding 84 and will simultaneously charge capacitor 80. During the positive half-cycle, diode 78 will block current flow through the winding 80, while capacitor 80 discharges through the winding. Thus, the level of DC current necessary to energize the relay is maintained.

The operation of the oscillator circuit shown in FIG. 2 differs from that of the oscillator circuit shown in FIG. 1 in that, when the four terminals are connected as indicated, the AC input is superimposed upon the DC input to cause tube 22 to conduct early in that half-cycle of the applied AC power which is of the same polarity as the applied DC power. In the oscillator circuit shown in FIG. 1, tube 22 conducts in that half-cycle of the applied AC power the polarity of which is opposite to that of the applied DC power. Both circuits achieve the desired voltage gradient across the tube 22, and the operation of each is otherwise identical to that of the other.

The advantages of the present invention, as well as certain changes and modifications to the disclosed embodiments thereof, will be readily apparent to those skilled in the art. For instance, the values of the applied AC peak voltage and the applied DC voltage may be varied so as to cause the initiation of a pulse train in a first half-cycle of a first polarity, with the pulse train continuing through the subsequent half-cycle of opposite polarity and ending in a third half-cycle of said first polarity. It is the applicant's intention to cover all those changes and modifications which could be made to the embodiments of the invention herein chosen for the purposes of the disclosure without departing from the spirit and scope of the invention.

I claim:

1. A relaxation oscillator circuit comprising:

a. first input circuit means operative to carry alternating current power;

b. second input circuit means operative to carry direct current power;

c. circuit means comprising variable capacitance means, first and second resistance means connected in series with one another and with said variable capacitance means, and voltage breakdown means connected across said variable capacitance means and said first resistance means, and operative to generate an output comprising a series of pulse trains, the first pulse of each pulse train having a substantially greater magnitude than the subsequent pulses in said pulse train, when alternating current power and substantially constant direct current power are simultaneously and continuously applied to said first and second input circuit means, respectively, said circuit means including means for varying said output; and d. output circuit means operative to carry said output.

2. The oscillator circuit as described in claim 1 wherein:

a. said variable capacitance means of said circuit means comprises:

i. a first capacitance means substantially constant in value, the first terminal of which is connected to said voltage breakdown means, and the second terminal of which is connected to said first resistance means;

ii. a second capacitance means connected in parallel with said first capacitance means, and having an antenna connected to one side for varying the value of said variable capacitance means by detecting variations in capacitance between said antenna and ground; and b. said voltage breakdown means comprises a gas-filled tube.

3. The oscillator circuit as described in claim 2 wherein said second capacitance means comprises a coaxial cable having first and second conductors, said antenna being connected to the end of said first conductor remote from said circuit means.

4. The oscillator circuit as described in claim 2 wherein said variable capacitance means further comprises:

a. first and second blocking capacitance means connecting the first and second terminals, respectively, of said first capacitance means to opposite sides of said second capacitance means, said second blocking capacitance being on the order of 100 times greater in value than said first blocking capacitance; and b. resistance means connecting the junction of said second capacitance means and said second blocking capacitance means to ground.

5. A capacitance-responsive circuit comprising:

a. conversion circuit means for converting alternating current power to direct current power;

b. an oscillator circuit comprising:

i. first input circuit means adapted to carry alternate current power;

ii. second input circuit means adapted to carry direct current power;

iii. circuit means operative to generate an output comprising a pulse train of predetermined polarity and magnitude during no more than one-half of each cycle of the applied alternating current power, when alternating current power and direct current power are applied to said first and second input means, respectively; said circuit means including means for varying said output;

iiii. output circuit means for carrying said output, said first input circuit means being connected to a source of alternating current power and said second input circuit means being connected to said conversion circuit means;

c. amplification means operative to amplify the output of said oscillator circuit and including:

i. a transistor; and ii. bias means including a gas-filled tube for regulating bias voltage;

d. switching means including anode, cathode and gate electrodes and controlled by applying the output of said amplification means to said gate electrode, said anode and cathode electrodes being connected in a current load path;

e. bias storage means connected between said gate electrode of said switching means and ground.

6. The capacitance responsive circuit according to claim 5 wherein the output load path of said amplification means is connected to said conversion circuit means.

7. The capacitance responsive circuit as described in claim 5 and further including electromagnetic relay means having a winding connected across said anode and cathode electrodes of said switching means, whereby said winding is energized when said switching means is nonconductive and deenergized when said switching means is conductive.

8. The capacitance responsive circuit as described in claim 7 wherein:

a. said switching means comprises a complementary transistor pair connected in the regenerative feedback configuration, the emitter electrodes of said transistor pair forming said cathode and anode electrodes of said switching means, and the collector and base electrodes of the first and second of said transistor pair are electrically connected to form said gate electrode of said switching means;

b. said bias storage means comprise a resistor and a capacitor;

c. a first and a second resistor are connected in series in said switching means, said second resistor being connected in parallel with a first half-wave rectifying means, the anode of which is connected to the emitter of the first of said transistor pair; and d. said winding of said relay is connected in parallel with a capacitor, and in series with a second half-wave rectifying means, the cathode of which is connected to anode of said first half-wave rectifying means.

9. The capacitance responsive circuit as described in claim 5 wherein:

a. in said oscillator circuit, said circuit means comprises:

i. variable capacitance means;

ii. first and second resistance means connected in series between one side of said capacitance means and said second input means; and iii. voltage breakdown means connected across said variable capacitance means and said first resistance means; and b. in said amplification means, said gas-filled tube of said bias means is connected in series with a resistor between the base and collector of said transistor, and is placed in proximity with the gas-filled tube of said oscillator circuit so as to bathe the latter with its light.